(12) United States Patent
Alicherry et al.

(10) Patent No.: US 9,164,800 B2
(45) Date of Patent: Oct. 20, 2015

(54) OPTIMIZING LATENCIES IN CLOUD SYSTEMS BY INTELLIGENT COMPUTE NODE PLACEMENT

(71) Applicants: Mansoor Alicherry, Bangalore (IN); T V. Lakshman, Morganville, NJ (US)

(72) Inventors: Mansoor Alicherry, Bangalore (IN); T V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 251 days.

(21) Appl. No.: 13/660,226

(22) Filed: Oct. 25, 2012

(65) Prior Publication Data

US 2014/0123132 A1    May 1, 2014

(51) Int. Cl.
*G06F 9/50* (2006.01)
*G06F 9/455* (2006.01)

(52) U.S. Cl.
CPC ............ *G06F 9/5005* (2013.01); *G06F 9/5066* (2013.01); *G06F 9/5072* (2013.01); *G06F 2009/4557* (2013.01)

(58) Field of Classification Search
None
See application file for complete search history.

(56) References Cited

U.S. PATENT DOCUMENTS

2013/0318525 A1\* 11/2013 Palanisamy et al. .............. 718/1

\* cited by examiner

*Primary Examiner* — Qing Wu (74) *Attorney, Agent, or Firm* — Kramer & Amado, P.C.

(57) ABSTRACT

Various exemplary embodiments relate to a method and related network node including one or more of the following: obtaining a set of compute nodes, a set of data nodes, and a set of edges between compute nodes and data nodes; determining an assignment objective to be achieved in assigning compute nodes from the set of compute nodes to data nodes from the set of data nodes; applying an algorithm associated with the assignment objective to obtain a set of assignments based on a plurality of costs associated with the set of edges; and assigning a compute node of the set of compute nodes to a data node of the set of data nodes based on the set of assignments.

24 Claims, 7 Drawing Sheets

OPTIMIZING LATENCIES IN CLOUD SYSTEMS BY INTELLIGENT COMPUTE NODE PLACEMENT

TECHNICAL FIELD

Various exemplary embodiments disclosed herein relate generally to cloud computing.

BACKGROUND

Many cloud operators currently host cloud services using a few large data centers, providing a relatively centralized operation. In such systems, a requestor may request the use of one or more resources from a cloud controller which may, in turn, allocate the requested resources from the data center for use by the requestor. This centralized operation, however, may not be well suited for hosting various types of applications, such as those with strict delay or reliability requirements.

Distributed data center architectures, on the other hand, provide a larger number of smaller data centers that may be geographically distributed. The data centers may remain under the control of one or more cloud controllers through a network such as the Internet or carrier networks. Under such a distributed system, the effects of network propagation delay may be reduced by providing cloud resources that are closer to a requestor in terms of geographic or network distance than a centralized cloud may be able to provide.

In various applications, a cloud may provision compute nodes, such as virtual machines, to process data stored by data nodes within the cloud. It may not always be possible, however, to guarantee that such data nodes will be local to the compute nodes processing the data. For example, a compute node may be located on a different server or rack in the data center of the data node, or may be located in a different data center from the data node. In such a case, issues such as propagation delay and bandwidth may further impact the communication latency between data nodes and compute nodes or between multiple computer nodes cooperating to perform a processing task.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed for assigning compute nodes to data nodes, the method including: obtaining a set of compute nodes, a set of data nodes, and a set of edges between compute nodes and data nodes; determining an assignment objective to be achieved in assigning compute nodes from the set of compute nodes to data nodes from the set of data nodes; applying an algorithm associated with the assignment objective to obtain a set of assignments based on a plurality of costs associated with the set of edges; and assigning a compute node of the set of compute nodes to a data node of the set of data nodes based on the set of assignments.

Various exemplary embodiments relate to a cloud controller for assigning compute nodes to data nodes, the cloud controller including: a memory; and a processor in communication with the memory, the processor being configured to: obtain a set of compute nodes, a set of data nodes, and a set of edges between compute nodes and data nodes, determine an assignment objective to be achieved in assigning compute nodes from the set of compute nodes to data nodes from the set of data nodes, apply an algorithm associated with the assignment objective to obtain a set of assignments based on a plurality of costs associated with the set of edges, and assign a compute node of the set of compute nodes to a data node of the set of data nodes based on the set of assignments.

Various exemplary embodiments relate to a non-transitory machine-readable storage medium encoded with instructions for execution by a cloud controller for assigning compute nodes to data nodes, the medium including: instructions for obtaining a set of compute nodes, a set of data nodes, and a set of edges between compute nodes and data nodes; determining an assignment objective to be achieved in assigning compute nodes from the set of compute nodes to data nodes from the set of data nodes; applying an algorithm associated with the assignment objective to obtain a set of assignments based on a plurality of costs associated with the set of edges; and assigning a compute node of the set of compute nodes to a data node of the set of data nodes based on the set of assignments.

Various embodiments are described wherein the assignment objective includes minimizing a total latency and the algorithm includes an assignment algorithm.

Various embodiments are described wherein the assignment objective includes minimizing a maximum latency and the algorithm includes: iteratively performing a binary search to identify an optimum threshold value, wherein an iteration of the binary search includes: identifying a current threshold value, generating a temporary set of edges that prevents selection of edges from the set of edges having a cost greater than the threshold value, applying an assignment algorithm based on the temporary set of edges to generate a current solution, and modifying selection of a next threshold value based on the current solution; and returning a solution associated with the optimum threshold.

Various embodiments are described wherein the assignment objective includes minimizing a total latency within a limit for a maximum latency and the algorithm includes: generating a modified set of edges that prevents selection of edges from the set of edges having a cost greater than the limit; and applying an assignment algorithm based on the modified set of edges.

Various embodiments are described wherein the assignment objective includes minimizing a maximum latency within a limit for a total latency and the algorithm includes: iteratively performing a binary search to identify an optimum threshold value, wherein an iteration of the binary search includes: identifying a current threshold value, generating a temporary set of edges that prevents selection of edges from the set of edges having a cost greater than the threshold value, applying an assignment algorithm based on the temporary set of edges to generate a current solution, comparing a total latency of the current solution to the limit, and modifying selection of a next threshold value based on the current solution and the comparison between the total latency of the current solution to the limit; and returning a solution associated with the optimum threshold.

Various embodiments additionally include weighting an initial cost of an edge of the set of edges based on an amount of data to be processed from a data node associated with the edge to produce a weighted cost of the edge, wherein the plurality of costs associated with the set of edges includes the weighted cost of the edge.

Various embodiments additionally include duplicating a duplicated node, wherein the duplicated node includes at least one of: a compute node of the set of compute nodes, and a data node of the set of data nodes, whereby the set of assignments includes at least two assignments related to the duplicated node.

Various embodiments are described wherein the set of compute nodes includes at least one established virtual machine (VM).

Various embodiments are described wherein the set of compute nodes includes at least one virtual machine (VM) that has not yet been established, and assigning a compute node of the set of compute nodes to a data node of the set of data nodes based on the set of assignments includes establishing the VM.

Various embodiments additionally include obtaining a set of compute cliques, wherein a compute clique of the set of compute cliques includes a set of compute nodes within a predetermined distance of each other, wherein applying the algorithm includes: applying the algorithm for edges of the set of edges associated with compute nodes belonging to a first compute clique of the set of compute cliques to produce a first set of assignments, applying the algorithm for edges of the set of edges associated with compute nodes belonging to a second compute clique of the set of compute cliques to produce a second set of assignments, identifying a best set of assignments based on the first set of assignments and the second set of assignments, and wherein assigning a compute node of the set of compute nodes to a data node of the set of data nodes based on the set of assignments includes assigning a compute node of the set of compute nodes to a data node of the set of data nodes based on the identified best set of assignments.

Various embodiments are described wherein obtaining a set of compute cliques includes: adding a first compute node to a new compute clique; adding a first plurality of compute nodes to the new compute clique, wherein the compute nodes of the first plurality of compute nodes are within a distance of half of a predetermined threshold to the first compute node; and adding the new compute clique to the set of compute cliques.

Various embodiments additionally include before adding the new compute clique to the set of compute cliques, adding a second plurality of compute nodes to the new compute clique, wherein the compute nodes of the second plurality of compute nodes are within a distance of the predetermined threshold to the first compute node and the first plurality of compute nodes.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Provisioning of resources within cloud environments may introduce unwanted bottlenecks due to unnecessarily high network distances between nodes that interact with each other. For example, a virtual machine (VM) or other compute node may communicate with data nodes and other compute nodes. Network latencies may be kept relatively low by thoughtful placement of the compute node in relation to the nodes with which the compute node will communicate. Accordingly, it would be desirable to provide a cloud controller and method for intelligently placing compute nodes in a cloud network.

Referring now to the drawings, in which like numerals refer to like components or steps, there are disclosed broad aspects of various exemplary embodiments.

Figure 1:
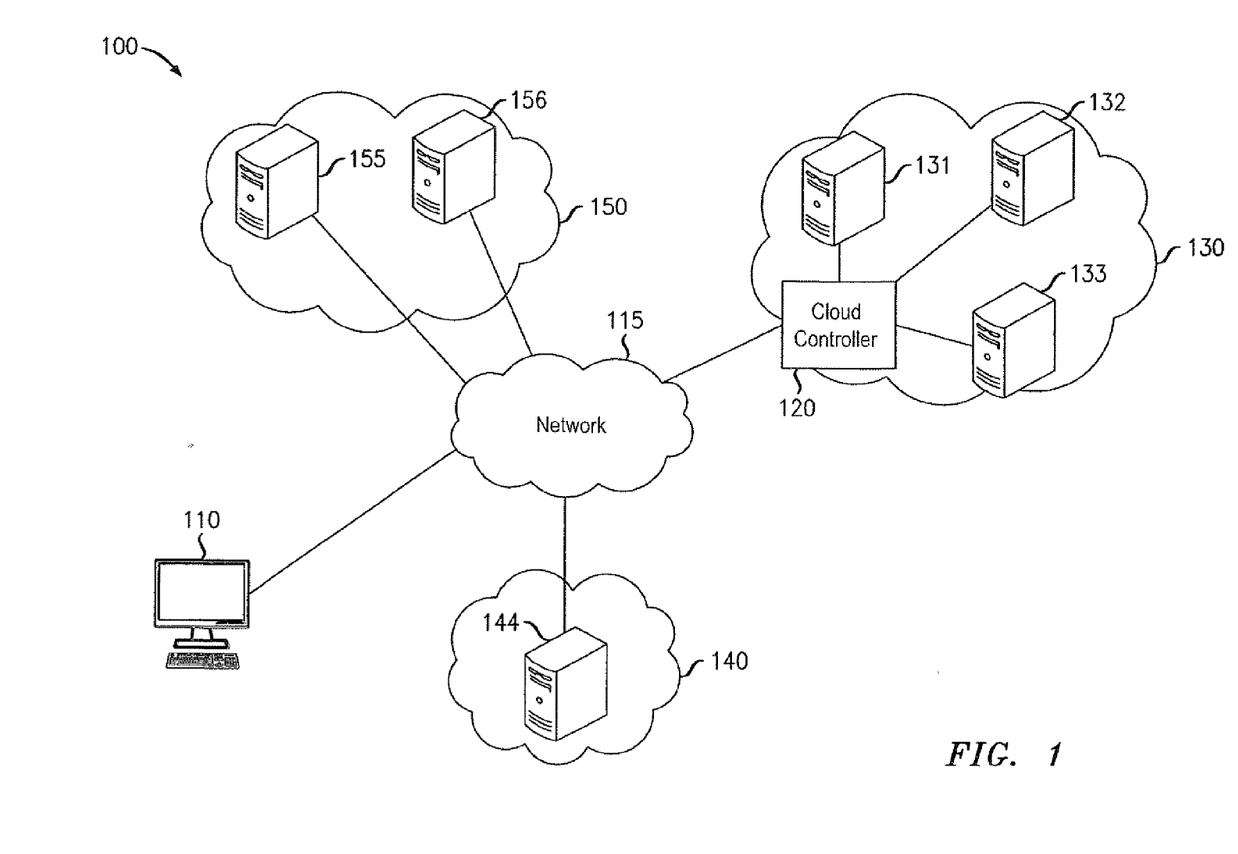
FIG. 1 illustrates an exemplary network for providing cloud resources.

FIG. 1 illustrates an exemplary network 100 for providing cloud resources. The network 100 may implement a networked cloud architecture and may include a client device 110, a network 115, a cloud controller 120, and data centers 130, 140, 150.

The client device 110 may be any device configured to utilize one or more cloud resources. In various embodiments, the client device 110 may be a desktop computer, laptop, tablet, mobile device, server, or blade. The client device 110 may communicate with other devices, such as the cloud controller 120, via the network 115. The client device 110 may transmit a request for one or more cloud resources to the cloud controller 120. For example, the client device 110 may request the use of one or more virtual machines (VMs), groups of VMs, storage devices, or memory. Additional types of cloud resources will be apparent. After allocation of such resources by the cloud controller 120, the client device 110 may communicate with one or more devices 131, 132, 133, 144, 155, 156 to utilize, access, or otherwise interface with the allocated cloud resources. The client device 110 may use such cloud resources for various reasons such as, for example, storing a media library, supplementing backend processing functions during periods of high demand, or wholly executing applications with which a user interacts via the client device 110. It will be apparent that the network 100 may include numerous additional client devices (not shown) that also make use of various cloud resources.

The network 115 may be any network of devices or transmission media capable of enabling communication between the various devices of the exemplary network 100. For example, the network 115 may include numerous devices configured to exchange and route data packets toward various destinations. In various embodiments, the network 115 may include the Internet or one or more carrier networks.

The cloud controller 120 may be a device configured to control the operations of a networked cloud. The cloud controller 120 may include various hardware such as a storage device, memory, or one or more processors, as will be described in greater detail below with respect to FIG. 9. As used herein, the term "processor" will be understood to encompass a variety of devices such as microprocessors, field programmable gate arrays (FPGAs), application-specific integrated circuits (ASICs), and other similar processing devices. In various embodiments, the cloud controller 120 may include, for example, a server, a blade, a personal computer, a laptop, a tablet, or a mobile device. The cloud controller 120 may reside at a data center, such as data center 130, or may reside elsewhere. The cloud controller 120 may perform various cloud management functions, including management of cloud resource allocation. As such, the cloud controller 120 may receive requests for cloud resources from client devices such as the client device 110. Upon receiving such requests, the cloud controller 120 may allocate requested resources from one or more of the cloud devices 131, 132, 133, 144, 155, 156, for use by client devices. In various embodiments, the exemplary network 100 may include multiple cloud controllers (not shown). Various techniques for coordinating the operation of multiple cloud controllers will be apparent.

The data centers 130, 140, 150 may each be locations supporting one or more devices that provide cloud resources. For example, data center 130 may host cloud devices 131, 132, 133; data center 140 may host cloud device 144; and data center 150 may host cloud devices 155, 156. The data centers 130, 140, 150 may be geographically distributed or may be situated at different network distances from the client device 110. For example, the client device 110 may be located in Washington, D.C., data center 140 may be located in New York, data center 150 may be located in Chicago, and data center 130 may be located in Seattle. According to this example, the client device 110 may experience less network latency when communicating with data center 140 than when communicating with data center 130. It will be apparent that the network 100 may include numerous additional data centers (not shown) and that each data center may include any number of cloud devices.

Each of cloud devices 131, 132, 133, 144, 155, 156 may be a device configured to provide cloud resources for use by client devices. In various embodiments, each of the cloud devices 131, 132, 133, 144, 155, 156 may be a desktop computer, laptop, tablet, mobile device, server, or blade. As such, the cloud devices 131, 132, 133, 144, 155, 156 may include various hardware such as, for example, storage devices, memory, or one or more processors. The cloud devices 131, 132, 133, 144, 155, 156 may be configured to provide processing, storage, memory, VMs, or groups of VMs for use by client devices such as the client device 110.

In addition to latencies introduced by communication between the client device 110 and the cloud devices 131, 132, 133, 144, 155, 156, cloud performance may also be impacted by other communication latencies. For example, in various applications one or more compute nodes, such as VMs, may process data served by one or more data nodes, such as cloud-provided storage. In such embodiments, latencies may be reduced by ensuring that data nodes are local to compute nodes processing the stored data. Such a constraint may not be possible to achieve in all cases. In some situations, there may not be sufficient available resources on a rack to support both the compute node and data node. In such instances, the compute node may be hosted on a different rack in a data center than the data node. In some situations, there may not be sufficient available resources in the data center, and the compute node may be provisioned in a different data center. For example, for a data node supported by cloud device 144 in New York City, a compute node supported by the same cloud device 144 may introduce a low latency. If such an arrangement is not possible, it would likely be desirable to establish a compute node on another device in data center 140. If this is also not possible, establishing the compute node in the Chicago data center 150 would likely introduce less latency to cloud operations than establishing the compute node in the Seattle data center 130. Similar considerations may be relevant when one compute node communicates with other compute nodes.

Figure 2:
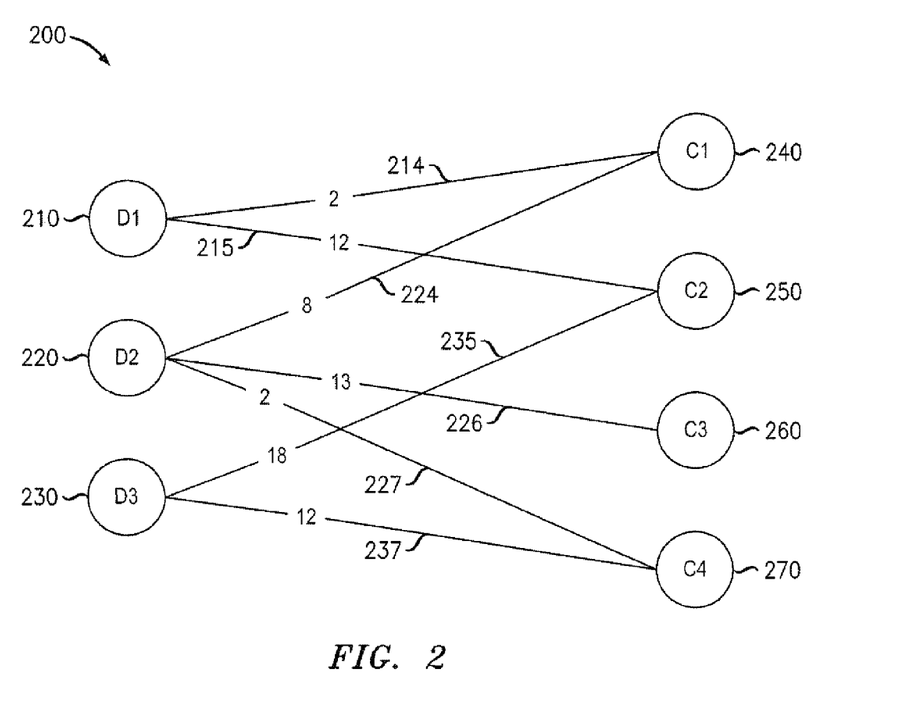
FIG. 2 illustrates an exemplary bipartite graph of data nodes and compute nodes.

The cloud controller 120 may employ various approaches for optimizing assignment of compute nodes to data nodes. The cloud controller 120 may perform such assignment in establishing new compute nodes or in assigning existing compute nodes to data nodes. FIG. 2 illustrates an exemplary bipartite graph 200 of data nodes 210, 220, 230 and compute nodes 240, 250, 260, 270. The data nodes 210, 220, 230 may represent cloud resources such as, for example, cloud-accessible storage holding data to be processed. Such storage may be accessible, for example, via a storage area network (SAN) of the cloud. The compute nodes 240, 250, 260, 270 may be, for example, virtual machines (VMs) or potential locations for establishing new VMs. The nodes 210, 220, 230, 240, 250, 260, 270 may be hosted by, for example, one or more of the data centers 130, 140, 150 of the exemplary network 100. As such, the nodes 210, 220, 230, 240, 250, 260, 270 may incorporate various hardware, or portions thereof, from the cloud devices 131, 132, 133, 144, 155, 156.

The bipartite graph 200 may illustrate an assignment problem for solution by a cloud controller. Possible assignments between the data nodes 210, 220, 230 and the compute nodes 240, 250, 260, 270 may be shown as edges 214, 215, 224, 226, 227, 235, 237. Each edge 214, 215, 224, 226, 227, 235, 237 may be associated with a cost representing, for example, a latency or network distance between the two nodes. In various embodiments, the cost may also be weighted by the amount of data to be processed, thereby accounting for increased network traffic due to a higher volume of data. For example, the cost of assigning compute node 240 to data node 210 may be represented as "2," while the cost of assigning compute node 250 to the same data node may be represented as "12." Thus, assignment of compute node 250 to the data node 210 may introduce more latency to the cloud system than assignment of compute node 240 to the data node 210.

In various embodiments, the cloud controller 120 may operate according to various constraints in solving an assignment problem of the type illustrated in the bipartite graph 200. For example, a valid solution to the assignment problem may include an assignment of a compute node 240, 250, 260, 270 to each of the data nodes 210, 220, 230. Further, the cloud controller 120 may ensure that each data node 210, 220, 230 is associated with only one compute node 240, 250, 260, 270 in a valid solution. Further still, the cloud controller 120 may ensure that each compute node 240, 250, 260, 270 is assigned at most one data node 210, 220, 230. Various additional or alternative constraints on a proper solution to an assignment problem will be apparent.

The cloud controller 120 may also consider one or more optimization constraints, or "assignment objectives," when determining an optimum assignment of compute nodes to data nodes. For example, the cloud controller may consider an assignment objective of minimizing a total latency, minimizing a maximum latency, minimizing a total latency within a limit on maximum latency, and minimizing a maximum latency within a limit on total latency.

When minimizing a total latency, the cloud controller 120 may select edges that add up (or average) to the lowest value. In the example of bipartite graph 200, the selection of edges 214, 227, 235 may produce the lowest total latency of "22." When minimizing a maximum latency, on the other hand, the cloud controller 120 may select edges such that that the maximum latency for any single edge is minimized. In the example of bipartite graph 200, the selection of edges 215, 224, 237 may produce the lowest maximum latency of "12," as carried by both edges 215 and 237.

The terms such as "minimize", "maximize," and "optimize," as used herein, will be understood to mean estimated values directed to achieving minimum, maximum or optimal values and as such as should be construed broadly as including those estimates that do not achieve actual minimal or maximum values.

Minimizing total latency within a limit on maximum latency may be similar to the process of minimizing total latency. For such an objective, the cloud controller 120 may avoid selecting an edge that violates the limit while minimizing the total latency. In the example of bipartite graph 200 and for a limit of 14, the cloud controller may select edges 214, 226, and 237 because, among those combinations of edges without any edges over a cost of "14," this combination has the lowest total latency of "27."

Minimizing maximum latency within a limit on total latency may be similar to the process of minimizing maximum latency. For such an objective, the cloud controller 120 may avoid solutions that violate the limit on total latency. In the example of bipartite graph 200 and for a limit of 25, the cloud controller may select edges 214, 226, 237 because, among those solutions with a total latency under "25," this combination has the lowest maximum edge cost of "13," as carried by edge 226. Various additional or alternative objectives for compute-node-to-data-node assignment will be apparent.

Figure 3:
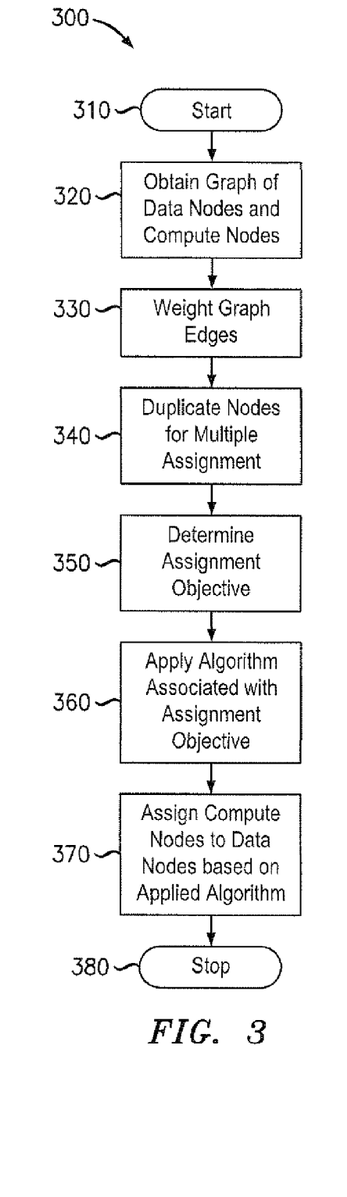
FIG. 3 illustrates an exemplary method for assigning data nodes to compute nodes.

FIG. 3 illustrates an exemplary method 300 for assigning data nodes to compute nodes. The method 300 may be performed, for example, by the cloud controller 120 to determine how a set of compute nodes should be assigned to a set of data nodes. Thus, the method 300 may be performed when a client requests the establishment of new virtual machines, when virtual machines request access to data, or whenever such an assignment is to be performed.

The method 300 may begin in step 310 and proceed to step 320 where the cloud controller 120 may obtain a graph or other representation of the data nodes and compute nodes. For example, the cloud controller 120 may receive or generate a representation the bipartite graph 200. Next, in step 330, the cloud controller 120 may weight the graph edges. For example, the cloud controller 120 may multiply the cost of the graph edge (which may represent, for example, the latency or network distance between nodes) by the amount of data to be processed or otherwise accessed from the data node. By doing so, the costs of the edges may more accurately reflect the load that will actually be placed on the network by each potential assignment.

Next, in step 340, the cloud controller 120 may determine whether any nodes should be allowed multiple assignments. For example, the cloud controller 120 may determine that a data node may be processed by two compute nodes or that one compute node may process two data nodes. In such a case, the cloud controller may duplicate the appropriate nodes and associated edges on the graph. For example, if data node 210 of exemplary graph 200 may be processed by multiple compute nodes, the cloud controller 120 may duplicate data node 210 and edges 214, 215 on the graph 200 such that a first compute node may be assigned to the duplicated data node (not shown) and a second compute node may be assigned to the original data node 210.

The cloud controller 120 may then, in step 350, determine the assignment objective to be applied. For example, the cloud controller may determine that the assignment objective is to minimize the total latency or to minimize the maximum latency within a total latency limit. Such determination may be made, for example, based on a client request or a cloud operator configuration. In various embodiments, the cloud controller 120 may not provide an option to select an assignment objective. For example, the cloud controller 120 may automatically select an objective based on network conditions. As another example, the cloud controller 120 may only provide a single objective. In such embodiments, step 350 may simply include accessing code specified for performing the assignment.

The cloud controller 120 may then proceed to apply an algorithm associated with the assignment objective to generate an optimum set of assignments. Various algorithms associated with various assignment objectives will be described in greater detail below. For example, the cloud controller 120 may have access to four different algorithms, each of which may be associated with a different one of four assignment objectives. It will be understood that the term "algorithm" as used herein broadly encompasses a sequence of steps. As such, while the cloud controller may be said to have access to four different algorithms, the four algorithms may be defined together within a single set of instructions. For example, the four algorithms may be implemented as a single set of instructions wherein portions of the sequence are skipped when not applicable (e.g., a step applicable only to algorithm 1 may be placed within an "if" structure that is only executed when the objective associated with algorithm 1 is sought). In various preferred embodiments, such as that described with respect to FIGS. 3-8, the algorithms are implemented as four distinct sequences of instructions.

After determining an optimum set of assignments, the cloud controller 120 may, in step 370, actually assign compute nodes to data nodes based on set of assignments. Such assignment may include communicating such assignments to existing compute nodes or spawning new compute nodes on the assigned hardware with the instruction to process the assigned data node. The method 300 may then proceed to end in step 380.

As mentioned above, the algorithm applied in step 360 may vary depending on the assignment objective. In the case of minimizing total latency, the cloud controller 120 may apply one of various "assignment algorithms" in view of the previously-described constraints. Such algorithms may be defined to operate on a bipartite graph and return an optimal solution in terms of minimal cost. In various embodiments, the assignment algorithm may be the Hungarian algorithm or any other known assignment algorithm.

Figure 4:
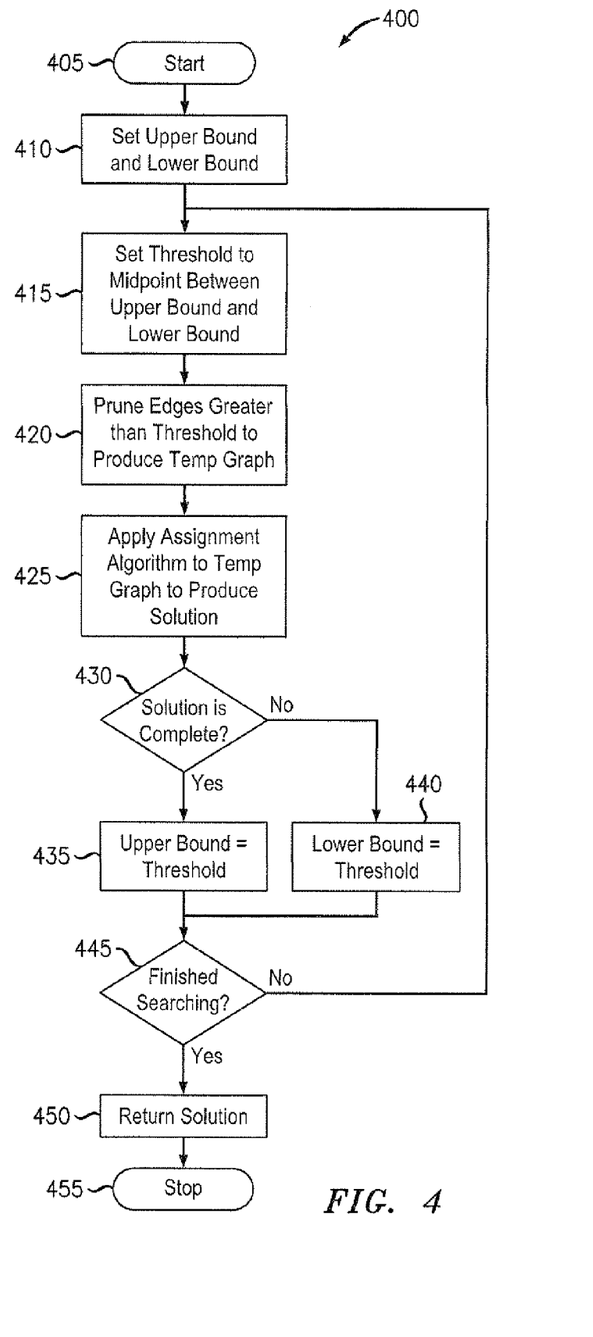
FIG. 4 illustrates an exemplary method for determining an assignment that minimizes a maximum latency between nodes.

In the case of minimizing a maximum latency, the cloud controller 120 may utilize a binary search and threshold algorithm to "zero in" on the optimum solution. FIG. 4 illustrates an exemplary method 400 for determining an assignment that minimizes a maximum latency between nodes. The exemplary method 400 may correspond to step 360 of exemplary method 300.

Method 400 may begin in step 405 and proceed to step 410 where the cloud controller 120 may set initial values for an upper bound and lower bound on the maximum edge cost. In various embodiments, the cloud controller 120 may set the lower bound to the value of the lowest cost edge on the graph and may set the upper bound to the value of the highest cost edge on the graph. Next, in step 415, the cloud controller 120 may set a current threshold to the midpoint between the lower bound and upper bound. In various embodiments, this midpoint may be rounded to the nearest integer value.

In step 420, the cloud controller 120 may produce a temporary graph that includes only those edges that do not surpass the current threshold. Alternatively, the cloud controller 120 may set the cost of those edges that surpass the threshold to infinity or a very large integer number. Various additional or alternative methods of preventing selection of particular edges will be apparent. In steps 425 and 430, the cloud controller may determine whether a valid solution exists for the temporary graph. For example, the cloud controller 120 may apply an assignment algorithm, such as the Hungarian algorithm, in step 425. Then, in step 430, the cloud controller may determine whether the applied algorithm produced a valid result. If the algorithm provided a complete solution, then the current threshold is now known to be the lowest tested threshold that produces a valid assignment. In view of this knowledge, the cloud controller 120 may set the upper bound to equal the value of the current threshold in step 435. If, on the other hand, the algorithm produces an error or an incomplete solution, then the threshold is now known to be the highest tested threshold that does not produce a valid assignment. In view of this knowledge, the cloud controller 120 may set the lower bound equal to the value of the current threshold in step 440.

In step 445, the cloud controller 120 may determine whether the search has finished. The cloud controller 120 may make this determination based on, for example, a determination that the upper threshold is equal to the lower threshold. Alternatively, the cloud controller 120 may determine that the difference between the upper threshold and the lower threshold is less than some predetermined minimum granularity for the binary search. As yet another alternative, the cloud controller 120 may end the search after a predetermined number of iterations. Various alternative criteria for ending the search will be apparent. If the cloud controller 120 is not finished searching, the method 400 may loop back to step 415. Otherwise, the cloud controller 120 may return the most recent solution in step 450, and the method 400 may proceed to end in step 455.

The above-described binary search may operate to produce the desired result because, as the threshold is increased, edges are only added and not taken away. This produces an ordered continuum wherein threshold values above the minimum maximum edge cost will produce a valid (though not necessarily optimum) solution while threshold values below the minimum maximum edge cost will not produce a valid solution because the minimum maximum edge has been removed. The binary search thus operates to "zero in" on the value of the minimum maximum edge necessary to produce a valid solution.

Figure 5:
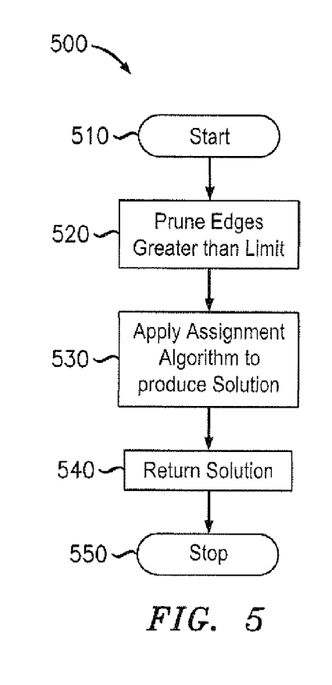
FIG. 5 illustrates an exemplary method for determining an assignment that minimizes a total latency between nodes while preserving a specified limit for a maximum latency between nodes.

In the case of minimizing a total latency within a limit on the maximum latency, the cloud controller 120 may find an optimum solution for a version of the graph lacking any edges that would violate the specified limit. FIG. 5 illustrates an exemplary method 500 for determining an assignment that minimizes a total latency between nodes while preserving a specified limit for a maximum latency between nodes. Method 500 may correspond to step 360 of method 300.

Method 500 may begin in step 510 and proceed to step 520 where the cloud controller may prune from the bipartite graph any edges that exceed the specified limit. For example, if the limit is set at a cost of "14," the cloud controller may modify exemplary bipartite graph 200 to produce a similar graph lacking edge 235, because the cost of "18" of edge 235 exceeds the limit of "14." Alternatively, that cloud controller 120 may set the cost of those edges that surpass the limit to infinity or a very large integer number.

Next, in step 530, the cloud controller 120 may apply an assignment algorithm such as, for example, the Hungarian algorithm to the pruned graph. The cloud controller 120 may then return the solution produced by the assignment algorithm in step 540, and the method 500 may then proceed to end in step 550.

Figure 6:
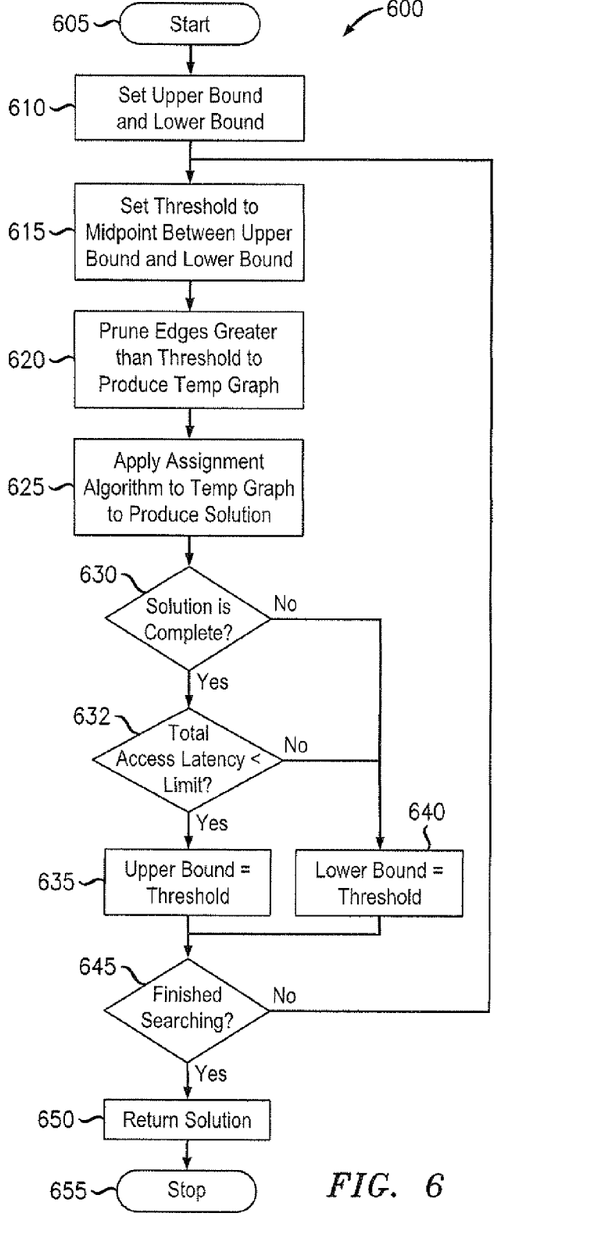
FIG. 6 illustrates an exemplary method for determining an assignment that minimizes a maximum latency between nodes while preserving a specified limit for a minimum latency between nodes.

In the case of minimizing a maximum latency within a limit on the total latency, the cloud controller 120 may perform a method similar to method 400 that additionally enforces the stated limit of total latency. Thus, the cloud controller 120 may utilize a binary search and threshold algorithm. FIG. 6 illustrates an exemplary method 600 for determining an assignment that minimizes a maximum latency between nodes while preserving a specified limit for a minimum latency between nodes.

Method 600 may begin in step 605 and proceed to step 610 where the cloud controller 120 may set initial values for an upper bound and lower bound on the maximum edge cost. In various embodiments, the cloud controller 120 may set the lower bound to the value of the lowest cost edge on the graph and may set the upper bound to the value of the highest cost edge on the graph. Next, in step 615, the cloud controller 120 may set a current threshold to the midpoint between the lower bound and upper bound. In various embodiments, this midpoint may be rounded to the nearest integer value.

In step 620, the cloud controller 120 may produce a temporary graph that includes only those edges that do not surpass the current threshold. Alternatively, the cloud controller 120 may set the cost of those edges that surpass the threshold to infinity or a very large integer number. In steps 625, 630, and 632, the cloud controller may determine whether a valid solution exists for the temporary graph that does not violate the limit on total latency. For example, the cloud controller 120 may apply an assignment algorithm, such as the Hungarian algorithm, in step 625. Then, in step 630, the cloud controller may determine whether the applied algorithm produced a valid result. If the algorithm produces an error or an incomplete solution, then the threshold is now known to be the highest tested threshold that does not produce a valid assignment. In view of this knowledge, the cloud controller 120 may set the lower bound equal to the value of the current threshold in step 640. If the algorithm provided a complete solution, the cloud controller 120 may then determine whether the solution violates the limit on total latency in step 632. If the total latency of the solution exceeds the limit, then it is known that the current threshold, while high enough to produce a complete solution, is not high enough to produce a solution that meets the limit on total access latency. In this case, the method 600 may proceed to step 640. If, on the other hand, the algorithm produces a valid solution that does not violate the total latency limit, then the current threshold is now known to be the lowest tested threshold that produces a valid assignment that meets the limit. In view of this knowledge, the cloud controller 120 may set the upper bound to equal the value of the current threshold in step 635.

In step 645, the cloud controller 120 may determine whether the search has finished. The cloud controller 120 may make this determination based on, for example, a determination that the upper threshold is equal to the lower threshold. Alternatively, the cloud controller 120 may determine that the difference between the upper threshold and the lower threshold is less than some predetermined minimum granularity for the binary search. As yet another alternative, the cloud controller 120 may end the search after a predetermined number of iterations. Various alternative criteria for ending the search will be apparent. If the cloud controller 120 is not finished searching, the method 600 may loop back to step 615. Otherwise, the cloud controller 120 may return the most recent solution in step 650, and the method 600 may proceed to end in step 655.

In view of the foregoing, a cloud controller may, in assigning compute nodes to data nodes, optimize the latencies between such nodes according to various objectives. In various applications, however, compute nodes may alternatively or additionally communicate with each other, introducing another form of communication that may be optimized. For such applications, a cloud controller may additionally take these inter-compute node latencies into account when optimizing assignments.

Figure 7:
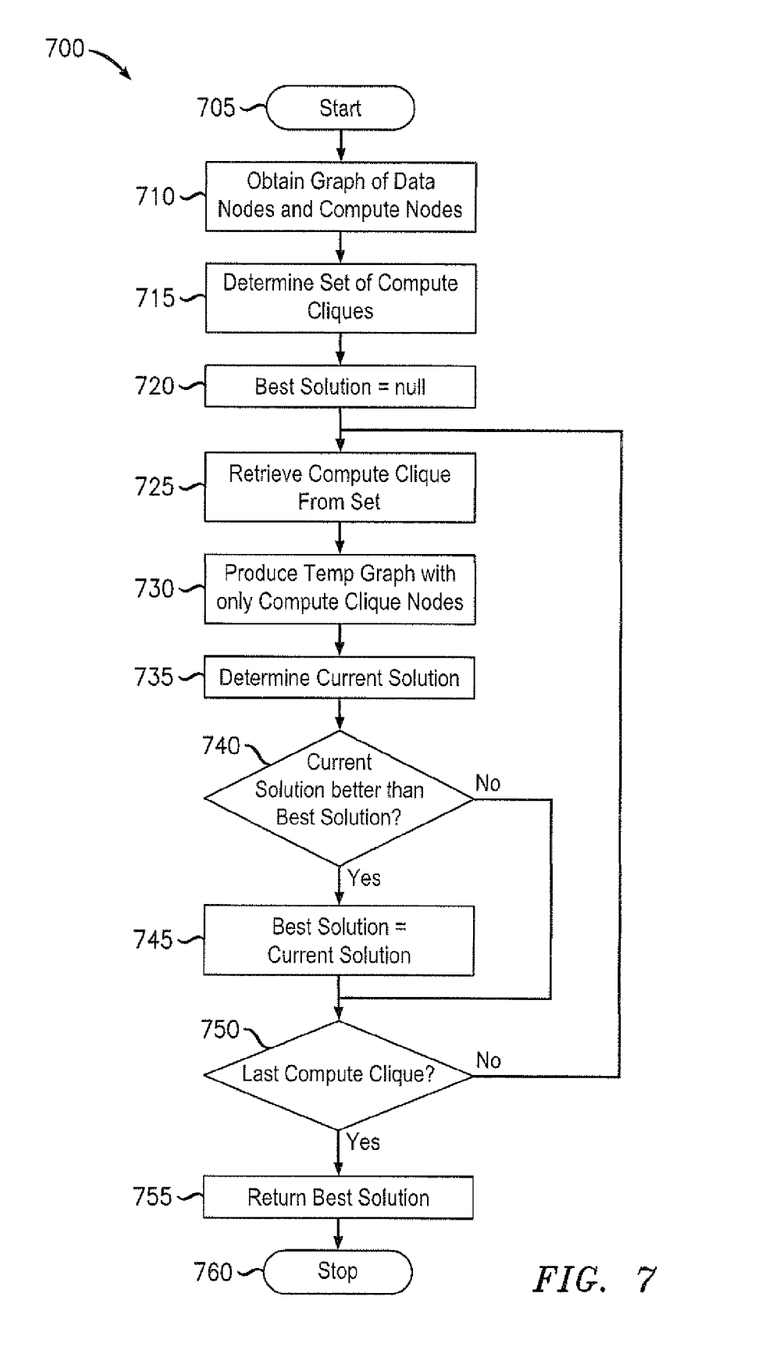
FIG. 7 illustrates an exemplary method for determining an assignment that preserves a specified minimum latency between compute nodes.

To optimize assignments in view of inter-compute node latencies, the cloud controller 120 may employ algorithms similar to those described above with respect to FIGS. 3-6. The cloud controller 120 may generate "compute cliques," sets of compute nodes within a specified network distance from one another, and determine an optimum solution for each compute clique. The cloud controller 120 may then return the best solution of those computed. FIG. 7 illustrates an exemplary method 700 for determining an assignment that preserves a specified minimum latency between compute nodes. Method 700 may correspond to step 360 of method 300 or may be applied in place of at least part of method 300.

Method 700 may begin in step 705 and proceed to step 710 where the cloud controller 120 may obtain a graph or other representation of the data nodes and compute nodes. For example, the cloud controller 120 may receive or generate a representation the bipartite graph 200. In embodiments where cloud controller 120 has already generated retrieved such a graph, step 710 may include receiving the graph from, for example, another process or another portion of the process calling method 700.

Next, in step 715, the cloud controller 120 may determine a set of compute cliques. The set may include one or more compute cliques, as previously described. The cloud controller may generate a set of compute cliques based on the distances between the compute nodes in the graph. An exemplary method of generating a set of compute cliques will be described in connection with FIG. 8. After determining the set of compute cliques to be evaluated, the cloud controller 120 may, in step 720, initialize the best known solution to a null value. Next, in step 725, the cloud controller 120 may retrieve a compute clique from the set of compute cliques to be evaluated. Next, in step 730, the cloud controller may produce a temporary graph to be evaluated by removing from the graph obtained in step 710 any compute nodes, and associated edges, that do not belong to the current compute clique. Alternatively, the cloud controller may set the cost of any edges associated with compute nodes not belonging to the clique to infinity or a very large integer. Then, in step 735, the cloud controller 120 may determine a current solution by applying an algorithm to the temporary graph. For example, the cloud controller 120 may apply an assignment algorithm, such as the Hungarian algorithm, method 400, method 500, or method 600 to determine an optimal assignment for the compute clique based on some assignment objective.

After determining a current solution for the current compute clique, the cloud controller 120 may compare the current solution to the best solution encountered so far, in step 740. If the cloud controller 120 determines in step 740, that the current solution is better than the previous best solution, the cloud controller 120 may set the best solution to instead store the current solution as the new best solution. Otherwise, the method 700 may skip to step 750. In determining whether a given solution is better than a previous best solution, the cloud controller may take into account the assignment objective. For example, if the assignment objective is to minimize a total latency, a current solution will replace the previous best solution when the total latency of the current solution is lower than the previous best. Methods for deeming one solution "better" than another in view of other assignment objectives will be apparent.

Next, in step 750, the cloud controller 120 may determine whether the set of compute cliques includes additional compute cliques to be evaluated. If so, the method 700 may loop back to step 725. Otherwise, if the current compute clique is the last compute clique of the set, the cloud controller may, in step 755, return the best solution for implementation. In various embodiments, step 755 may include actually assigning compute nodes to data nodes according to the solution by, for example, communicating with the hardware in one or more data centers to establish new compute nodes or instruct existing compute nodes as to their assigned data nodes. The method 700 may then proceed to end in step 760.

Figure 8:
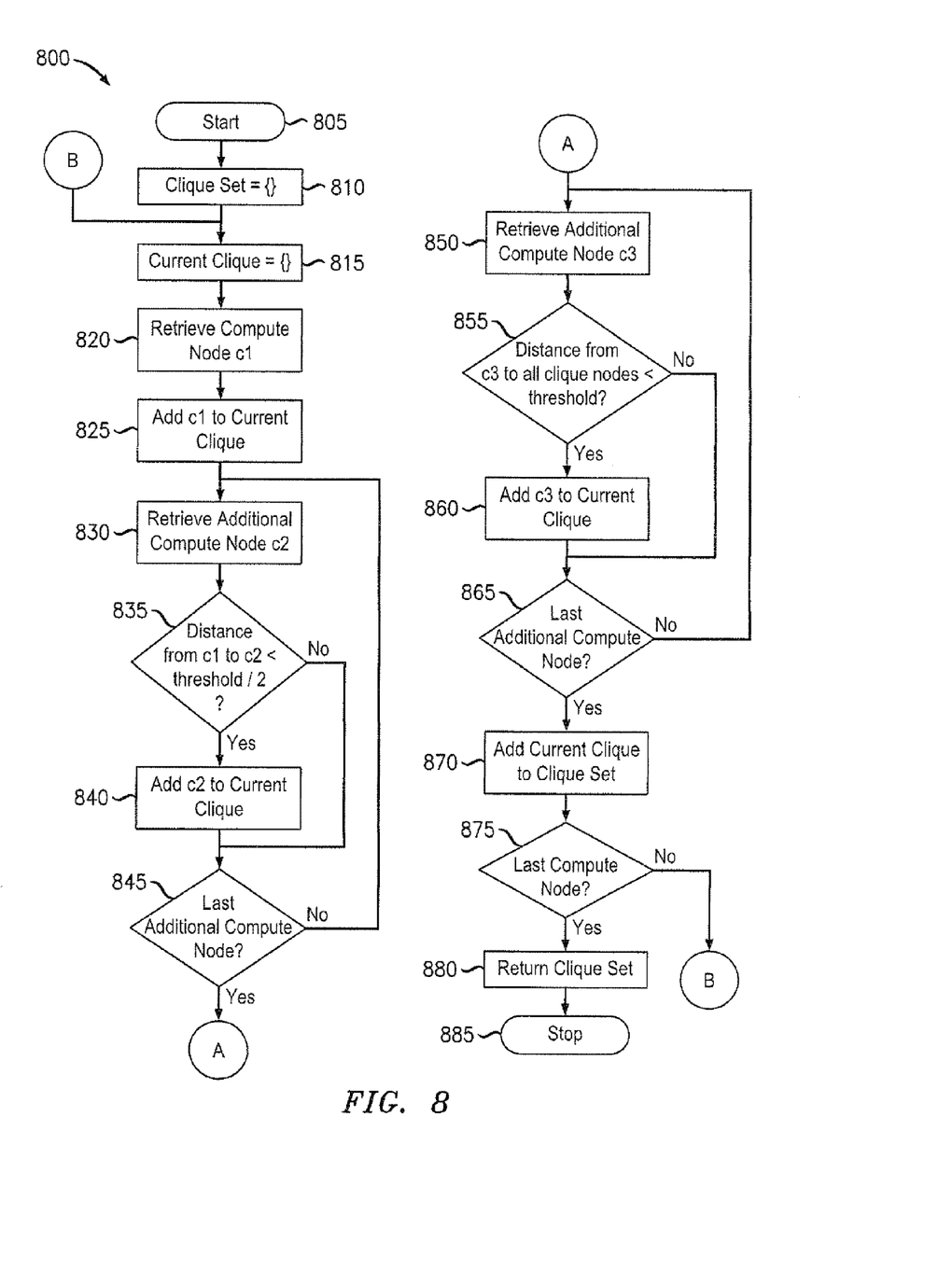
FIG. 8 illustrates an exemplary method for determining a set of compute cliques.

FIG. 8 illustrates an exemplary method 800 for determining a set of compute cliques. Method 800 may be performed by cloud controller 120 and may correspond to step 715 of method 700. Method 800 may determine, from a graph or set of compute nodes, a set of compute cliques, where each compute clique contains those compute nodes located within a specified threshold network distance from each other.

Method 800 may begin in step 805 and proceed to step 810 where the cloud controller 120 may initialize a clique set to an empty set. The cloud controller 120 may also initialize a current clique to an empty set in step 815. Next, in step 820, the cloud controller 120 may retrieve a first compute node "c1" from the graph, to be used as the root of the compute clique. The cloud controller 120 may add the compute node c1 to the current clique in step 830. Next, the cloud controller may begin a first pass through the remaining compute nodes in step 830 by retrieving a compute node "c2" from the graph other than c1. In step 835, the cloud controller 120 may determine whether the network distance between c1 and c2 is less than the threshold divided by two. If so, the cloud controller 120 may, in step 840, add the additional compute node c2 to the current clique. Otherwise, the method 800 may skip to step 845, where the cloud controller 120 may determine whether additional compute nodes remain to be processed in this pass. If so, the method 800 may loop back to step 830.

By comparing the distance from the "root" compute node to half of the threshold, the cloud controller 120 can be assured on this first pass that each compute node added will be no further away from any other compute node in the compute clique than the threshold. In particular, while the inter-compute node distances follow the triangle inequality, if all nodes in the clique are no further than the half threshold from the center node, then the maximum inter-node distance will be at most the threshold. In this manner, the cloud controller can make a first pass of the compute nodes that applies a single comparison to determine whether to include each compute node in the compute clique.

After the first pass has been completed, the method 800 may proceed from step 845 to step 850, where the cloud controller 120 may begin a second pass of compute nodes. The cloud controller 120 may retrieve a first additional compute node "c3" from the graph to be processed. The cloud controller 120 may retrieve such additional compute nodes on the second pass from those compute nodes not already added to the compute clique. Next, in step 855, the cloud controller 120 may determine whether the distance from c3 to every other node in the clique is less than the threshold. Thus, step 855 may include multiple comparisons. If the distance from c3 to all other compute nodes within the current compute clique is less than the threshold, then the cloud controller 120 may add the additional compute node c3 to the current clique. Otherwise, the method 800 may skip to step 865 where the cloud controller 120 may determine whether additional compute nodes remain to be processed in this pass. If so, the method 800 may loop back to step 850. After the second pass is complete, the cloud controller 120 may, in step 870, add the current clique to the clique set.

In step 875, the cloud controller 120 may determine whether additional clique sets remain to be generated. For example, in the embodiment pictured, the cloud controller 120 may iterate through, and generate a compute clique for, each compute node on the graph. Thus, in step 875, the cloud controller 120 may determine whether additional compute nodes remain to be processed as root compute nodes. If so, the method 800 may loop back to step 815. Additional or alternative methods for determining whether additional cliques should be computed will be apparent. After all compute cliques to be generated have been generated, the cloud controller 120 may return the clique set for further use in step 880, and the method 800 may proceed to end in step 885.

It will be apparent that method 800 may not necessarily locate all possible compute cliques for a given set of compute nodes. Various modifications to method 800 will be apparent for ensuring that a greater number of possible cliques are located. Such modification for fuller evaluation of possible cliques may come at a cost of processing resources, as more passes or more complex processing may be utilized to achieve this result. Such completeness in locating compute cliques may not yield a similar improvement in performance of the selected optimum assignment. As such, an approximating or otherwise less-complete method may be sufficient.

Figure 9:
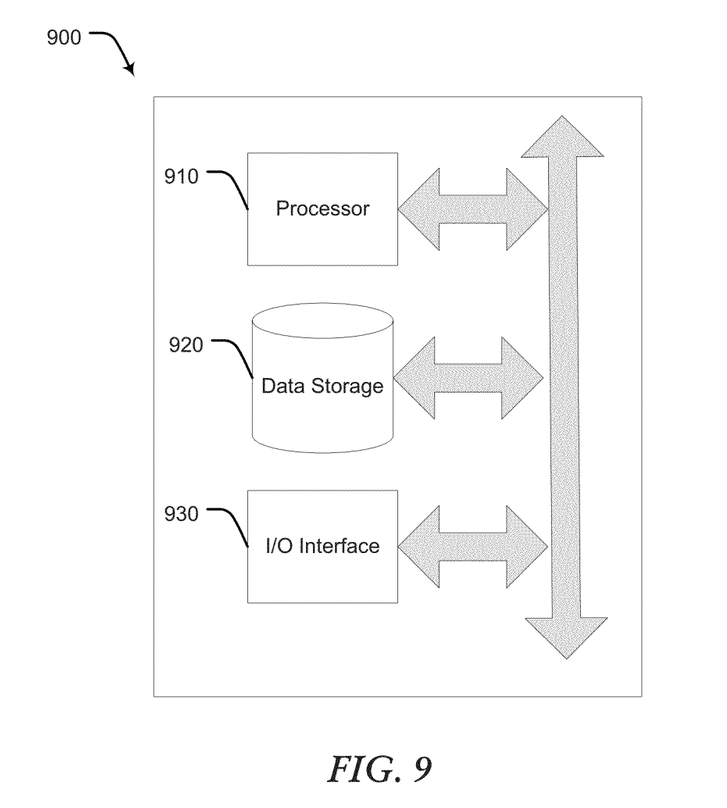
FIG. 9 illustrates an exemplary cloud controller.

FIG. 9 illustrates an exemplary cloud controller 900. The cloud controller may include a processor 910, a data storage 920, and an input/output (I/O) interface 930.

The processor 910 controls the operation of the cloud controller 900 and cooperates with the data storage 920, and the I/O interface 930, via a system bus.

The data storage 920 may store program data such as various programs useful in managing resources in a cloud. For example, the data storage 920 may store instructions for performing one or more algorithms such as, for example, those described in connection with methods 300, 400, 500, 600, 700, and/or 800.

The I/O interface 930 may cooperate with the processor 910 to support communications over one or more communication channels. For example, the I/O interface 930 may include a user interface, such as a keyboard and monitor, and/or a network interface, such as one or more Ethernet ports.

In some embodiments, the processor 910 may include resources such as processors/CPU cores, the I/O interface 930 may include any suitable network interfaces, or the data storage 920 may include memory or storage devices. Moreover the cloud controller 900 may be any suitable physical hardware configuration such as: one or more server(s), blades consisting of components such as processor, memory, network interfaces or storage devices. In some of these embodiments, the cloud controller 900 may include cloud network resources that are remote from each other.

In some embodiments, the cloud controller 900 may be virtual machine. In some of these embodiments, the virtual machine may include components from different machines or be geographically dispersed. For example, the data storage 920 and the processor 910 may be in two different physical machines.

In some embodiments, the cloud controller 900 may be a general purpose computer programmed to perform the methods 300, 400, 500, 600, 700, and/or 800.

When processor-executable programs are implemented on a processor 910, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database (s).

According to the foregoing, various embodiments enable various optimizations of latencies when assigning compute nodes to data nodes in a cloud environment. For example, by applying various algorithms described herein, a cloud controller may perform such an assignment while achieving one or more assignment objectives. Further, by performing assignments for various cliques of compute nodes, the cloud controller may also take into account inter-compute node constrains. Additional benefits will be apparent in view of the foregoing.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a cloud controller for assigning compute nodes to data nodes, the method comprising:
    obtaining, by the cloud controller, a set of compute nodes, a set of data nodes, and a set of edges between compute nodes and data nodes;
    determining an assignment objective to be achieved in assigning compute nodes from the set of compute nodes to data nodes from the set of data nodes; and
    assigning a compute node of the set of compute nodes to a data node of the set of data nodes based on the assignment objective and a plurality of costs associated with the set of edges;
    wherein the assignment objective is based on a latency cost used in obtaining a set of assignments by applying an algorithm.

2. The method of claim 1, wherein the assignment objective comprises minimizing a total latency and the algorithm comprises an assignment algorithm.

3. The method of claim 1, wherein the assignment objective comprises minimizing a maximum latency and the algorithm comprises:
    iteratively performing a binary search to identify an optimum threshold value, wherein an iteration of the binary search comprises:
        identifying a current threshold value,
        generating a temporary set of edges that prevents selection of edges from the set of edges having a cost greater than the threshold value,
        applying an assignment algorithm based on the temporary set of edges to generate a current solution, and
        modifying selection of a next threshold value based on the current solution; and
    returning a solution associated with the optimum threshold.

4. The method of claim 1, wherein the assignment objective comprises minimizing a total latency within a limit for a maximum latency and the algorithm comprises:
    generating a modified set of edges that prevents selection of edges from the set of edges having a cost greater than the limit; and
    applying an assignment algorithm based on the modified set of edges.

5. The method of claim 1, wherein the assignment objective comprises minimizing a maximum latency within a limit for a total latency and the algorithm comprises:
    iteratively performing a binary search to identify an optimum threshold value, wherein an iteration of the binary search comprises:
        identifying a current threshold value,
        generating a temporary set of edges that prevents selection of edges from the set of edges having a cost greater than the threshold value,
        applying an assignment algorithm based on the temporary set of edges to generate a current solution,
        comparing a total latency of the current solution to the limit, and
        modifying selection of a next threshold value based on the current solution and the comparison between the total latency of the current solution to the limit; and
    returning a solution associated with the optimum threshold.

6. The method of claim 1, further comprising:
    weighting an initial cost of an edge of the set of edges based on an amount of data to be processed from a data node associated with the edge to produce a weighted cost of the edge,
    wherein the plurality of costs associated with the set of edges comprises the weighted cost of the edge.

7. The method of claim 1, further comprising:
    duplicating a duplicated node, wherein the duplicated node comprises at least one of:
        a compute node of the set of compute nodes, and
        a data node of the set of data nodes,
    whereby the set of assignments includes at least two assignments related to the duplicated node.

8. The method of claim 1, wherein the set of compute nodes comprises at least one established virtual machine (VM).

9. The method of claim 1, wherein the set of compute nodes comprises at least one virtual machine (VM) that has not yet been established, and
    assigning a compute node of the set of compute nodes to a data node of the set of data nodes based on the set of assignments comprises establishing the VM.

10. The method of claim 1, further comprising:
    obtaining a set of compute cliques, wherein a compute clique of the set of compute cliques comprises a set of compute nodes within a predetermined distance of each other,
    wherein applying the algorithm comprises:
        applying the algorithm for edges of the set of edges associated with compute nodes belonging to a first compute clique of the set of compute cliques to produce a first set of assignments,
        applying the algorithm for edges of the set of edges associated with compute nodes belonging to a second compute clique of the set of compute cliques to produce a second set of assignments,
        identifying a best set of assignments based on the first set of assignments and the second set of assignments, and
    wherein assigning a compute node of the set of compute nodes to a data node of the set of data nodes based on the set of assignments comprises assigning a compute node of the set of compute nodes to a data node of the set of data nodes based on the identified best set of assignments.

11. The method of claim 10, wherein obtaining a set of compute cliques comprises:
    adding a first compute node to a new compute clique;
    adding a first plurality of compute nodes to the new compute clique, wherein the compute nodes of the first plurality of compute nodes are within a distance of half of a predetermined threshold to the first compute node; and adding the new compute clique to the set of compute cliques.

12. The method of claim 11, further comprising:
before adding the new compute clique to the set of compute cliques, adding a second plurality of compute nodes to the new compute clique, wherein the compute nodes of the second plurality of compute nodes are within a distance of the predetermined threshold to the first compute node and the first plurality of compute nodes.

13. A cloud controller for assigning compute nodes to data nodes, the cloud controller comprising:
a memory; and
a processor in communication with the memory, the processor being configured to:
obtain a set of compute nodes, a set of data nodes, and a set of edges between compute nodes and data nodes,
determine an assignment objective to be achieved in assigning compute nodes from the set of compute nodes to data nodes from the set of data nodes,
assign a compute node of the set of compute nodes to a data node of the set of data nodes based on the assignment objective and a plurality of costs associated with the set of edges;
wherein the assignment objective is based on a latency cost used in obtaining a set of assignments by applying an algorithm.

14. The cloud controller of claim 13, wherein the assignment objective comprises minimizing a total latency and the algorithm comprises an assignment algorithm.

15. The cloud controller of claim 13, wherein the assignment objective comprises minimizing a maximum latency and the algorithm comprises:
iteratively performing a binary search to identify an optimum threshold value, wherein an iteration of the binary search comprises:
identifying a current threshold value,
generating a temporary set of edges that prevents selection of edges from the set of edges having a cost greater than the threshold value,
applying an assignment algorithm based on the temporary set of edges to generate a current solution, and
modifying selection of a next threshold value based on the current solution; and
returning a solution associated with the optimum threshold.

16. The cloud controller of claim 13, wherein the assignment objective comprises minimizing a total latency within a limit for a maximum latency and the algorithm comprises:
generating a modified set of edges that prevents selection of edges from the set of edges having a cost greater than the limit; and
applying an assignment algorithm based on the modified set of edges.

17. The cloud controller of claim 13, wherein the assignment objective comprises minimizing a maximum latency within a limit for a total latency and the algorithm comprises:
iteratively performing a binary search to identify an optimum threshold value, wherein an iteration of the binary search comprises:
identifying a current threshold value,
generating a temporary set of edges that prevents selection of edges from the set of edges having a cost greater than the threshold value,
applying an assignment algorithm based on the temporary set of edges to generate a current solution,
comparing a total latency of the current solution to the limit, and
modifying selection of a next threshold value based on the current solution and the comparison between the total latency of the current solution to the limit; and
returning a solution associated with the optimum threshold.

18. The cloud controller of claim 13, wherein the processor is further configured to:
weight an initial cost of an edge of the set of edges based on an amount of data to be processed from a data node associated with the edge to produce a weighted cost of the edge,
wherein the plurality of costs associated with the set of edges comprises the weighted cost of the edge.

19. The cloud controller of claim 13, wherein the processor is further configured to:
duplicate a duplicated node, wherein the duplicated node comprises at least one of:
a compute node of the set of compute nodes, and
a data node of the set of data nodes,
whereby the set of assignments includes at least two assignments related to the duplicated node.

20. The cloud controller of claim 13, wherein the set of compute nodes comprises at least one established virtual machine (VM).

21. The cloud controller of claim 13, wherein the set of compute nodes comprises at least one virtual machine (VM) that has not yet been established, and
in assigning a compute node of the set of compute nodes to a data node of the set of data nodes based on the set of assignments, the processor is configured to establish the VM.

22. The cloud controller of claim 13, wherein the processor is further configured to:
obtain a set of compute cliques, wherein a compute clique of the set of compute cliques comprises a set of compute nodes within a predetermined distance of each other,
wherein, in applying the algorithm, the processor is configured to:
apply the algorithm for edges of the set of edges associated with compute nodes belonging to a first compute clique of the set of compute cliques to produce a first set of assignments,
apply the algorithm for edges of the set of edges associated with compute nodes belonging to a second compute clique of the set of compute cliques to produce a second set of assignments, and
identify a best set of assignments based on the first set of assignments and the second set of assignments, and
wherein, in assigning a compute node of the set of compute nodes to a data node of the set of data nodes based on the set of assignments, the processor is configured to assign a compute node of the set of compute nodes to a data node of the set of data nodes based on the identified best set of assignments.

23. The cloud controller of claim 22, wherein, in obtaining a set of compute cliques, the processor is configured to:
add a first compute node to a new compute clique;
add a first plurality of compute nodes to the new compute clique, wherein the compute nodes of the first plurality of compute nodes are within a distance of half of a predetermined threshold to the first compute node; and
add the new compute clique to the set of compute cliques.

24. The cloud controller of claim 23, wherein the processor is further configured to: before adding the new compute clique to the set of compute cliques, add a second plurality of compute nodes to the new compute clique, wherein the compute nodes of the second plurality of compute nodes are within a distance of the predetermined threshold to the first compute node and the first plurality of compute nodes.

* * * * *